DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED MAY 19, 1970

874 O.G. 697

T874,007

PHOTOCONDUCTIVE ELEMENTS CONTAINING LIGHT-SENSITIVE POLYMERIC BINDERS

Lawrence E. Contois, Webster, N.Y.
(Kodak Park, Rochester, N.Y. 14650)

Filed June 30, 1969, Ser. No. 837,916
Int. Cl. G03g *5/06, 7/00*
U.S. Cl. 96—1.5
No Drawing. 39 Pages Specification

Novel photoconductive elements comprise an electrically conducting support bearing a layer of a novel photoconductive composition comprising a photoconductor and a binder therefor which is an electrically insulating, film-forming light-sensitive polymer. The light-sensitive polymer acts as a combined binder and sensitizer. The photoconductive composition can contain additional sensitizers as well as other addenda. Particularly useful photoconductors include organic photoconductors such as arylamine photoconductors, e.g., triphenylamine, 4,4′- benzylidene-bis - (N,N-diethyl-m-toluidine), bis-4-diethylaminotetraphenylmethane, etc., and particularly useful light-sensitive polymers include polyesters (including polycarbonates) containing the styryl ketone group such as those described in Borden et al. U.S. Pat. 3,453,237, issued July 1, 1969, e.g., the polyester condensation product of divanillal cyclopentanone, tetrachloro Bisphenol A and neopentyl bischloroformate.